L. H. WOODRUFF.
GAUGE COCK.
APPLICATION FILED MAY 25, 1922.
1,432,510.
Patented Oct. 17, 1922.
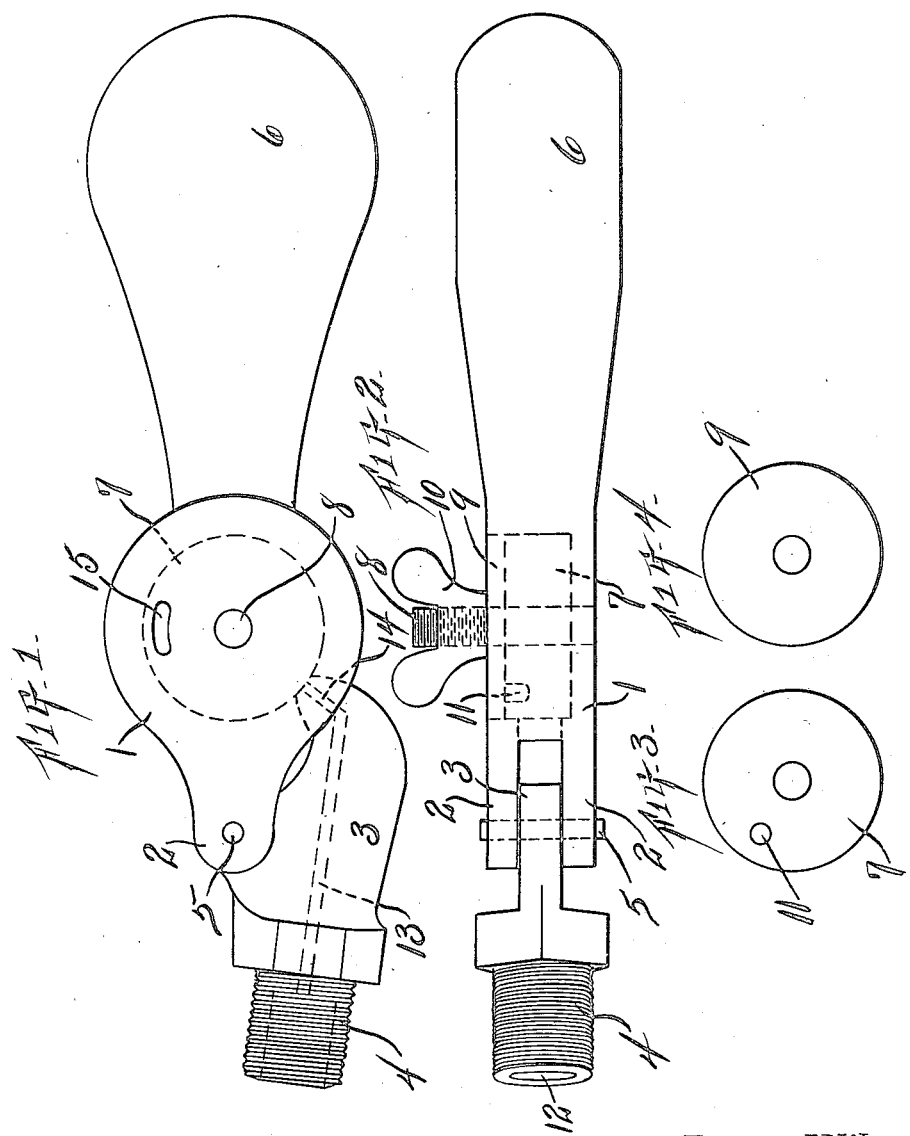
Inventor
LOVELL H WOODRUFF.
By A. L. Jackson
Attorney Patented Oct. 17, 1922.

1,432,510

UNITED STATES PATENT OFFICE.

LOVELL H. WOODRUFF, OF FORT WORTH, TEXAS, ASSIGNOR TO J. E. SHAFFER, OF TULSA, OKLAHOMA.

GAUGE COCK.

Application filed May 25, 1922. Serial No. 563,728.

*To all whom it may concern:*

Be it known that I, LOVELL H. WOODRUFF, a citizen of the United States, residing at Forth Worth, in the county of Tarrant and State of Texas, have invented certain new and useful Improvements in Gauge Cocks, of which the following is a specification.

My invention relates to steam gauge or test cocks; and the object is to provide a simple and economical gauge cock for steam boilers by which the steam can be readily tested and which is adapted to close the orifice automatically and to provide a construction which will not be disarranged in operation and which is so constructed that the valve may be easily adjusted when worn so that the life of the valve may be prolonged. Other objects and advantages will be fully explained in the following description and the invention will be more particularly pointed out in the claims.

Reference is had to the accompanying drawings which form a part of this application.

Fig. 1 is a side elevation of the gauge cock. Fig. 2 is a plan view of the same. Fig. 3 is a face view of the valve. Fig. 4 is a face view of the disk or cover which incloses the valve.

Similar characters of reference are used to indicate the same parts throughout the several views.

The gauge cock is provided with a casing 1 of irregular shape and is bifurcated to form the jaws 2. The steam nozzle 3 is to be tapped into the boiler and has a threaded shank 4 to be screwed into the boiler. The nozzle member 3 is pivotally connected to the jaws 2 by a pivot bolt 5. The pivot bolt 5 must be strong enough to support the weighted lever 6. The lever 6 is preferably made integral with the casing 1. A cylindrical cavity is formed in the casing 1 for the valve 7. A stud bolt 8 is made rigid with the casing 1 by welding or brazing. The valve 7 is held in place by a cylindrical cover 9. A thumb nut 10 is screwed against the cover 9 to press or clamp the cover against the valve 7. The valve 7 has a small cavity 11 in one face, the face adjacent to the cover 9, for convenience in adjusting the valve. A small instrument can be used to turn the valve 7. The valve 7 is preferably made of Babbitt metal, but it is apparent that this valve may be made of other material.

If the valve 7 becomes worn by the steam, the nut 10 may be removed and the cover 9 removed. With a small pointed instrument to enter the cavity 11, the valve 7 can be turned to bring a new surface to meet the discharge from the nozzle 3. The stud 8 is threaded only far enough to clamp the cover 9 on the valve. The cover 9 and the cavity in the casing 1 will securely hold the valve in place. The valve rests against the bottom of the cavity and friction will hold the valve in any position required.

The nozzle member 3 has a steam cavity 12 and a duct 13 leading from the cavity 12 and an angular duct 14 leads from the duct 13 to the valve 7. The casing 1 has an aperture 15 for convenience in forcing the valve 7 out of the cavity in the casing if the valve should be held rigid therein.

The contact of the nozzle 3 against the valve makes a seat for the valve and this seat may be changed as often as may be necessary. If the valve becomes worn entirely around the periphery thereof, the peripheral face may be ground to cylindrical form again and then used again until the peripheral surface is worn entirely around again. The stud bolt will always hold the valve centrally positioned because the stud is permanently rigid with the casing.

What I claim is,—

1. A gauge cock comprising a steam discharge nozzle, a valve casing pivotally connected thereto, the valve casing having a slot therein to receive said nozzle and having a cylindrical cavity therein, a valve mounted in said cavity to bear against the end of said nozzle for normally closing said nozzle, a stud welded to and rigid with said casing and projecting through said valve, a cylindrical cover perforated to receive the stud mounted on said valve, a nut for clamping said cover on said valve, and a weighted lever formed on said casing and adapted to hold said valve against said nozzle.

2. A gauge cock comprising a casing having a cylindrical cavity therein and a slot in one end leading to said cavity and having jaws on each side of said slot, a discharge nozzle pivotally mounted in said jaws and extending to said cavity, a valve cylindrical in form and having a perforation therethrough and a non-rotatable stud rigid with the bottom of said cavity and projecting through said perforation, a cover for pressing said valve against the bottom of said cavity, a nut for clamping said cover on said valve, and a weighted lever rigid with said casing for holding said valve against said nozzle.

3. A gauge cock comprising a casing having a cylindrical cavity therein and a slot in one end leading to said cavity and having jaws on each side of said slot, a cylindrical valve having a perforation therethrough and having a small cavity in one side or face, a stud rigid with said casing and projecting through said valve perforation, a cover mounted on said stud for inclosing said valve, a nut for clamping said cover on said valve, said casing having an aperture in the side for convenience in removing said valve, and a weighted lever rigid with said casing for holding said valve against said nozzle.

In testimony whereof, I set my hand this 19th day of May, 1922.

LOVELL H. WOODRUFF.